Inventor
Donald R. Humphreys
By his Attorney
Carl E. Johnson.

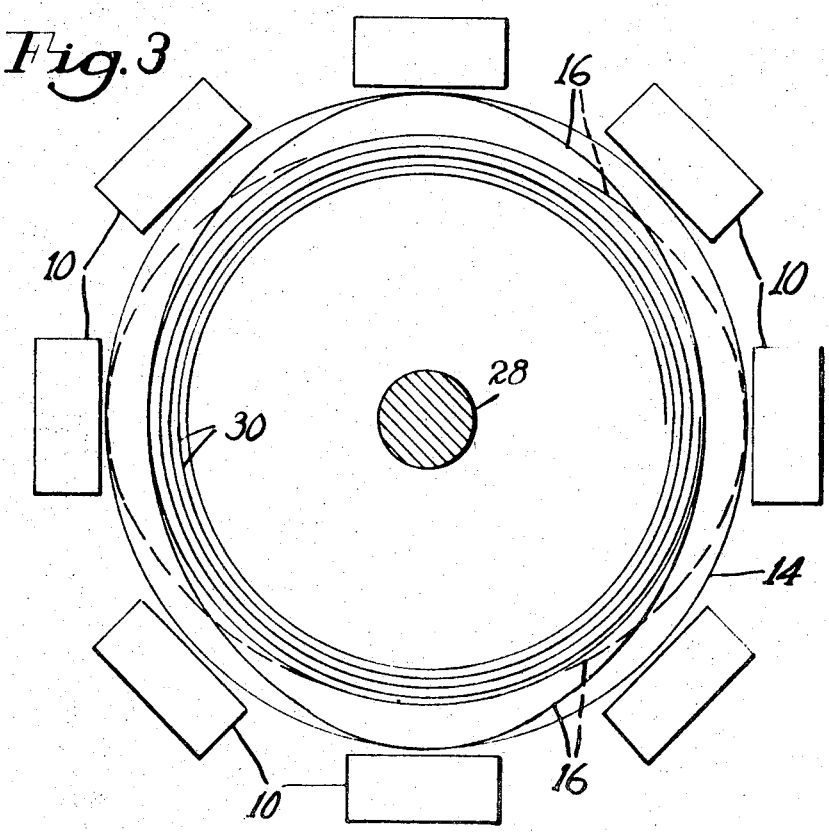

United States Patent Office 3,561,006
Patented Feb. 2, 1971

---

3,561,006
ELECTROMAGNETIC ACTUATORS WITH DEFLECTIBLE ROTOR
Donald R. Humphreys, Topsfield, Mass., assignor to USM Corporation, Flemington, N.J., a corporation of New Jersey
Filed May 22, 1969, Ser. No. 826,878
Int. Cl. H02k 7/06
U.S. Cl. 310—82                             3 Claims

ABSTRACT OF THE DISCLOSURE

A high-response stepping motor incorporates in coaxial relation an open-ended flexspline having inner and outer teeth which cooperate, respectively, with inner and outer, oppositely disposed, circular spline teeth, the meshing occurring simultaneously upon stator energization at spaced circumferential localities rotationally out of phase with each other. The outer circular spline teeth may be formed on stator pole faces, and the inner circular splines may be formed externally on a rotary output member.

BACKGROUND OF THE INVENTION

This invention pertains to electric motors, especially to precision stepping motors providing high response, low inertia angular stepping. Servo positioning devices of the type set forth in the patents above mentioned utilize electromagnetic force to propagate a wave of circumferential radial deflection in a tubular rotor. This wave is converted to a reduced rotary output, generally employing harmonic drive actuation the basic mechanical principles of which have earlier been disclosed, for instance in U.S. Letters Pat. No. 2,906,143, issued Sept. 29, 1959 upon an application filed in the name of C. Walton Musser.

While harmonic drive type actuators including the servo motor versions referred to feature such characteristics as unusually low weight to torque ratio and very low back lash, the present invention additionally makes possible shortened axial length, improved versatility as to drive ratios, and higher efficiency.

SUMMARY OF THE INVENTION

A primary object of this invention is to provide a compact and more adaptable angular stepping actuator.

A further and more specific object is to provide a rotary stepping motor utilizing an electrically energized circumferential wave of radial deflection in a flexspline for reacting simultaneously on both a stator and a meshing coaxial circular spline whereby the latter is angularly driven as output member.

To these ends and as herein shown there is coaxially disposed within a stator comprised of sequentially energized pairs of poles defining a substantially circular set of spline teeth, an inner circular spline mounted for rotation as an output member, and an open-ended tubular flexspline disposed between the stator and the circular spline, the flexspline having internal and external spline teeth for respectively meshing in out of phase localities with the circular spline and the stator during enertization of the latter to elliptoidally shape a flexspline, rotate such shape about the common axis, and thereby angularly drive the circular spline.

Preferably for dynamic balance and as illustrated, the tooth meshing localities occur 90° out of phase as the major and minor axes of the elliptoidally deflected flexspline shape are rotated bi-directionally. Advantageously employing the interior of the stator to optimum advantage, a preferred arrangement disposes inner and outer circumferential spline teeth of the flexspline midway of its open ends and in radial alignment with the stator teeth and circular spline teeth. This permits spaced coils of flexible magnetic shim stock, one on each side of the circular spline, significantly to reduce air gap and hence reluctance in the electromagnetic field.

BRIEF DESCRIPTION OF THE DRAWINGS

The foregoing and other features of the invention will now be more particularly described in connection with an illustrated embodiment thereof and with reference to the accompanying drawings in which:

FIG. 3 is an exaggerated schematic view illustrating the rotating elliptoidal shape of the deflected flexspline, its vertical major axis position being shown in full line and its simultaneous vertical minor axis position being shown dashed.

DESCRIPTION OF THE PREFERRED EMBODIMENT

Figure 1:
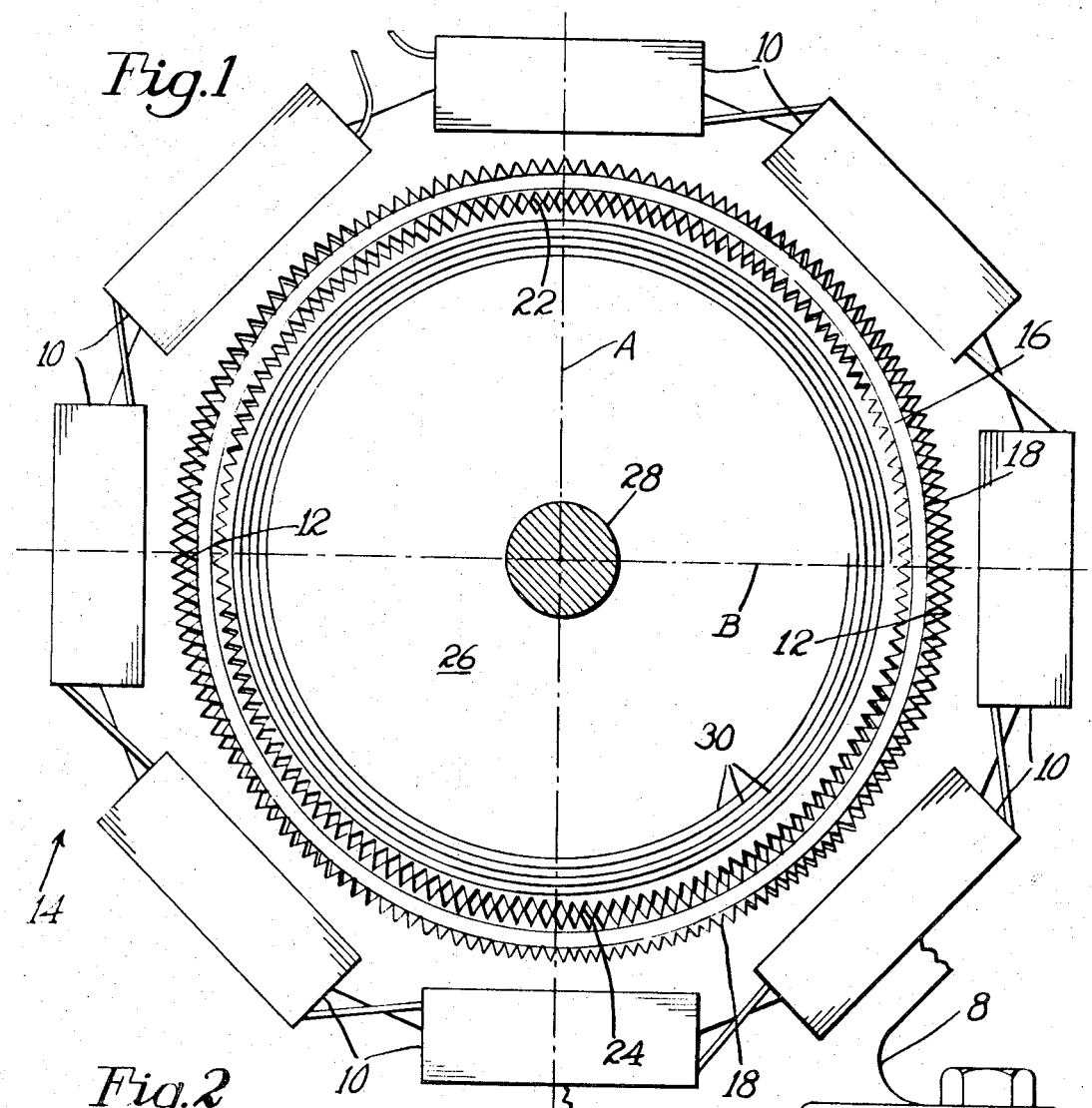
FIG. 1 is a transverse section of essential portions of an electromagnetic stepping motor including stator, flexspline, and circular output spline, the flexspline being shown in deflected or operating condition.

A stator housing 8 (FIG. 1) is fixedly mounted to support in circular arrangement a series of circumferentially adjacent pairs of stator poles 10, the arcuate pole faces being formed with spline teeth 12. The function of the stator, generally designated 14, is to radially deflect a coaxial flexspline 16 preferably open at both ends into elliptoidal shape and to rotate that shape. (While other shapes such as trilobal may be used, the elliptoidal is commonly preferred). For this purpose it is generally preferred to energize the diametrically opposed pairs of poles simultaneously and sequentially in the manner disclosed in the above cited Pat. 3,331,974 though other driving circuitry may be employed.

In keeping with the well-known principles of harmonic drive actuator design, when meshing elliptoidal shapes are employed the number of teeth in the outer splined member is commonly 2 or a multiple of 2 more than the next inner member in mesh therewith. Accordingly, external spline teeth 18 on the flexspline 16 may be 2 less than the total number of spline teeth 12 on the pole faces, and similarly internal flexspline teeth 22 may be 2 more than the spline teeth 24 externally formed on a coaxial output circular spline 26. The latter is affixed on a shaft 28 which may extend in either or both axial directions from the circular spline 26.

Figure 2:
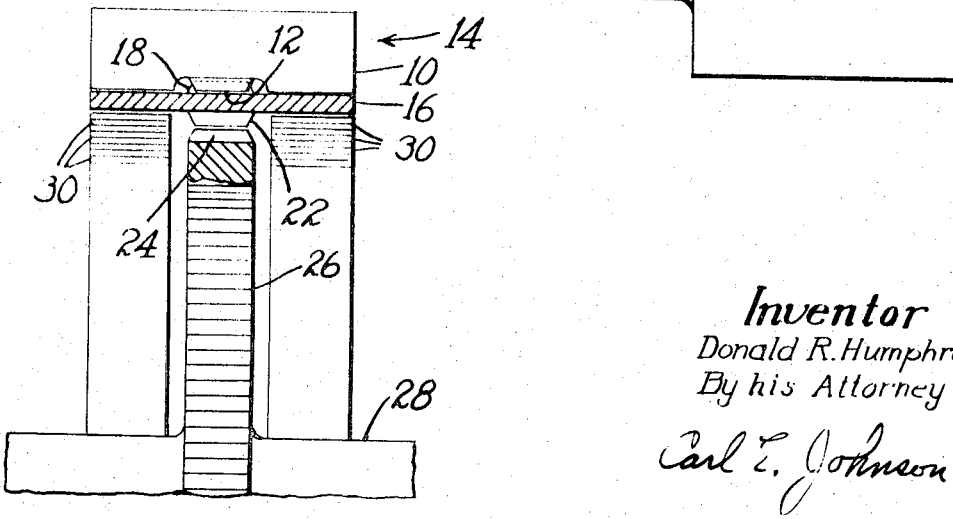
FIG. 2 is an axial quarter section taken on the vertical axis shown in FIG. 1.

As shown in FIG. 2 magnetic shim stock 30 is disposed in a coil on each side of the circular spline 26, though it will be apparent that the shim stock may extend on only one side, for instance when the shaft 28 terminates at the circular spline 26. Though not thus shown herein it may be noted that the shim stock may also be wrapped externally on the flexspline adjacent to the flexspline teeth, or it may be thus arranged exclusively. These dispositions may be of particular advantage in the instances where a plastic flexspline is employed. The minimal air gap resultant enables better efficiency due to reduction in reluctance. Also, it will be understood that, though not illustrated, the stator coils 10 may be disposed radially inward of a flexspline instead of outward.

It will be appreciated that spline tooth differential as between meshing sets of splines may be other than two in number when desired for producing different ratios, and indeed either pair of reacting circumferential surfaces may even be formed without splines, relying on roughened or serrated surfaces for frictional interengagement where a high order of precision stepping is not required. The flexspline in its deenergized condition is circular and without meshing engagement so that replacement of one flexspline for another having substantially the same diameter but having different sets of numbers of inner and outer spline teeth is readily effected when a different number of output steps per revolution is desired from the otherwise same stepping motor.

The motor described has operation which is distinguished from that of the units referred to previously in that, when radially deflected to elliptoidal shape, the flexspline 16 has inner and outer localities simultaneously in spaced circumferential engagement, these localities being out of phase. As illustrated in FIG. 1 outer flexspline localities along the major axis A are in mesh with diametrically opposite stator pole face teeth, and 90° out of phase, i.e. along the minor axis B (shown horizontal in FIG. 1) inner flexspline localities are in mesh with external spline teeth 22 of the output circular spline 26. Thus, in effect, the rotating or stepping elliptoidal shape of the deflected flexspline is supported in stable manner during operation. As the magnetic field of the stator 14 is stepped, preferably by simultaneous pulsed energization at diametrically opposite localities the major axis of the flexspline extending through those localities is rotatably stepped in corresponding degree and with substantially no inertia, and practically no backlash.

Having thus described my invention, what I claim as new and desire to secure by Letters Patent of the U.S. is:

1. An electromagnetic rotary actuator comprising a stator having a plurality of poles circularly disposed and formed with internal spline teeth and a coaxial output circular spline having external teeth, an open-ended radially deflectible tubular flexspline disposed intermediate the stator and circular spline and having oppositely disposed external and internal spline teeth for meshing, in out-of-phase circumferential localities, with the stator teeth and the circular spline teeth, respectively, upon energization of the stator, and circuit means for simultaneously and sequentially energizing opposite stator poles whereby the flexspline is radially deflected at spaced circumferential localities and the localities of meshing are advanced to drive the circular spline.

2. An actuator as set forth in claim 1 wherein the external and internal spline teeth of the flexspline extend axially over a central axial portion thereof, and coils of reluctance-reducing material are respectively arranged on opposite axial sides of the flexspline teeth.

3. An actuator as set forth in claim 2 wherein the flexspline is deflected into elliptoidal shape whereby the localities of its external and internal meshing are 90° out of phase.

References Cited

UNITED STATES PATENTS

| | | | |
|---|---|---|---|
| 2,761,079 | 8/1956 | Giertz-Hedestrom | 310—82 |
| 3,147,640 | 9/1964 | Musser | 74—640 |
| 3,301,091 | 1/1967 | Reese | 310—83 |
| 3,452,227 | 6/1969 | Welch | 310—80 |
| 3,456,139 | 7/1969 | Newell | 310—82 |

MILTON O. HIRSHFIELD, Primary Examiner

R. SKUDY, Assistant Examiner

U.S. Cl. X.R.

310—49, 83